(12) United States Patent
Billaud et al.

(10) Patent No.: US 9,932,215 B2
(45) Date of Patent: Apr. 3, 2018

(54) LIFT ARM SUSPENSION SYSTEM FOR A POWER MACHINE

(71) Applicant: Clark Equipment Company, West Fargo, ND (US)

(72) Inventors: Gaetan Billaud, Treillieres (FR);
Nicolas Gales, Pouldreuzic (FR);
Laurent Gicquel, Coueron (FR);
Nathalie LeBeuze, Savenay (FR);
Gilles Siegwald, Saint-Nazaire (FR);
Allen C. Olheiser, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 14/391,999

(22) PCT Filed: Apr. 10, 2013

(86) PCT No.: PCT/US2013/035968
§ 371 (c)(1),
(2) Date: Oct. 10, 2014

(87) PCT Pub. No.: WO2013/155178
PCT Pub. Date: Oct. 17, 2013

(65) Prior Publication Data
US 2015/0081178 A1 Mar. 19, 2015

Related U.S. Application Data

(60) Provisional application No. 61/622,743, filed on Apr. 11, 2012.

(51) Int. Cl.
*G06F 7/70* (2006.01)
*G06F 19/00* (2011.01)
(Continued)

(52) U.S. Cl.
CPC .............. *B66F 9/22* (2013.01); *B60G 17/056* (2013.01); *B66F 9/065* (2013.01); *B66F 9/0655* (2013.01);
(Continued)

(58) Field of Classification Search
CPC .............. F16D 31/02; B66F 9/22; G08B 5/00
(Continued)

(56) References Cited

U.S. PATENT DOCUMENTS

| 4,872,702 A | 10/1989 | Medley |
| 5,147,172 A | 9/1992 | Hosseini |

(Continued)

FOREIGN PATENT DOCUMENTS

| CN | 1212661 A | 3/1999 |
| CN | 101790614 A | 7/2010 |

(Continued)

OTHER PUBLICATIONS

English Translation for WO2012/035324.*
(Continued)

*Primary Examiner* — Mahmoud S Ismail
(74) *Attorney, Agent, or Firm* — John D. Veldhuis-Kroeze; Westman, Champlin & Koehler, P.A.

(57) ABSTRACT

Disclosed are power machines and lift arm suspension or ride control systems for use thereon. A lift arm assembly is pivotally coupled to a frame of the power machine and is capable of being raised and lowered. A selectively activated lift arm suspension system is operably coupled to the lift arm assembly. A controller is coupled to the suspension system and configured to determine whether the lift arm assembly has moved more than a threshold amount. The controller deactivates the lift arm suspension system in response to determining that the lift arm assembly has moved more than the threshold amount.

20 Claims, 9 Drawing Sheets

(51) Int. Cl.
| | |
|---|---|
| G06G 7/00 | (2006.01) |
| G06G 7/76 | (2006.01) |
| B66F 9/22 | (2006.01) |
| E02F 3/34 | (2006.01) |
| E02F 9/20 | (2006.01) |
| E02F 9/22 | (2006.01) |
| B66F 9/065 | (2006.01) |
| B60G 17/056 | (2006.01) |
| F15B 1/02 | (2006.01) |

(52) U.S. Cl.
CPC .......... *E02F 3/3414* (2013.01); *E02F 9/2033* (2013.01); *E02F 9/2203* (2013.01); *F15B 1/021* (2013.01); *B60G 2300/022* (2013.01); *B60G 2400/95* (2013.01); *F15B 2211/41581* (2013.01); *F15B 2211/426* (2013.01); *F15B 2211/625* (2013.01); *F15B 2211/6336* (2013.01); *F15B 2211/6346* (2013.01); *F15B 2211/761* (2013.01); *F15B 2211/8606* (2013.01)

(58) Field of Classification Search
USPC .............................................. 340/666; 701/50
See application file for complete search history.

(56) References Cited

U.S. PATENT DOCUMENTS

| | | | |
|---|---|---|---|
| 5,195,864 A | 3/1993 | Drake et al. | |
| 5,520,499 A | 5/1996 | Ufheil et al. | |
| 5,733,095 A | 3/1998 | Palmer et al. | |
| 6,634,653 B2 | 10/2003 | Chatterjea | |
| 7,165,395 B2 | 1/2007 | Anderson et al. | |
| 7,194,856 B2 | 3/2007 | Ma et al. | |
| 7,243,494 B2 | 7/2007 | Evans | |
| 7,448,208 B2 | 11/2008 | Montineri | |
| 7,756,622 B2 | 7/2010 | Gianoglio et al. | |
| 7,878,422 B2 | 2/2011 | Heiniger et al. | |
| 7,908,048 B2 | 3/2011 | Vigholm et al. | |
| 8,065,875 B2 | 11/2011 | Vigholm et al. | |
| 2006/0075750 A1* | 4/2006 | Evans | 60/416 |
| 2007/0056278 A1* | 3/2007 | Montineri | 60/413 |
| 2009/0057045 A1 | 3/2009 | Stromberg et al. | |
| 2009/0158726 A1 | 6/2009 | Hanks et al. | |
| 2010/0024411 A1 | 2/2010 | Payne et al. | |
| 2010/0268410 A1* | 10/2010 | Vigholm et al. | 701/29 |
| 2014/0167971 A1* | 6/2014 | Stanley | E02F 9/264 340/666 |

FOREIGN PATENT DOCUMENTS

| | | | | |
|---|---|---|---|---|
| EP | 2072692 | | 6/2009 | |
| GB | 2418903 A | | 4/2006 | |
| GB | WO 2012035324 A1 | * | 3/2012 | ............ B66F 9/0655 |
| WO | 9732769 A1 | | 9/1997 | |

OTHER PUBLICATIONS

Search Report dated Jul. 2, 2013 for International Application No. PCT/US2013/035968, 4 pages.
Chinese Office Action and English translation dated Jan. 7, 2016 for corresponding Chinese Application No. 201380019558.8, 18 pages.
Chinese Office Action with English translation dated Oct. 10, 2016 for Chinese Application No. 201380019558.8, 19 pages.

* cited by examiner

LIFT ARM SUSPENSION SYSTEM FOR A POWER MACHINE

CROSS-REFERENCE TO RELATED APPLICATION

This Application is a Section 371 National Stage Application of International Application No. PCT/US2013/035968, filed Apr. 10, 2013 and published as WO 2013/155178 on Oct. 17, 2013.

BACKGROUND

Power machines or vehicles include various work vehicles such as telehandlers, skid steer loaders, tracked loaders, excavators, and utility vehicles. Telehandlers and other power machines typically utilize a hydraulic system including one or more hydraulic pumps that provide pressurized hydraulic fluid to accomplish a number of tasks. Examples of such tasks include powering travel motors in a drive system, positioning a lift arm assembly, rotating implements that may be coupled to the lift arm assembly with respect to the lift arm assembly, and providing hydraulic fluid to actuators on certain implements for performing functions related to the implement, and the like.

Some power machines, including some embodiments of the power machines listed above, have axles that are rigidly mounted to the frame of the machine. As such, they do not have suspension systems between the frame and axles to absorb shock that can be introduced into the power machine when travelling over rough terrain. Some of these power machines utilize the mass of their lift arm assembly and any load that the lift arm assembly may be carrying, which can include attached implements and any material in such an implement, as a suspension system for absorbing such shock. Suspension systems that utilize a lift arm assembly in this manner are known as "ride control systems" or "lift arm suspension systems." Ride control or lift arm suspension systems include components that selectively allow the lift arm assembly to move up and down slightly when raised above a fully lowered position as the power machine moves over rough terrain, thereby allowing the lift arm assembly to absorb shock and provide a smoother ride for the operator and for the load.

Typical lift arm suspension systems utilize an accumulator to store pressurized hydraulic fluid that aids one or more lift actuators to raise or lower the lift arm assembly slightly as the vehicle traverses the rough terrain, thereby providing ride control. However, under certain conditions in which the accumulator is not sufficiently charged with pressurized hydraulic fluid, a large downward force on the lift arm assembly can force hydraulic fluid from the one or more lift actuators into the accumulator, resulting in an uncommanded lowering of the lift arm assembly.

The discussion above is merely provided for general background information and is not intended to be used as an aid in determining the scope of the claimed subject matter.

SUMMARY

In one embodiment, a power machine is disclosed. The power machine includes a frame and a lift arm assembly pivotally coupled to the frame that is capable of being raised and lowered with respect to the frame. A selectively activated lift arm suspension system is operably coupled to the lift arm assembly. A controller is coupled to the suspension system. The controller is configured to determine whether the lift arm assembly has moved more than a threshold amount and to deactivate the lift arm suspension system when it has determined that the lift arm assembly has moved more than the threshold amount.

In another embodiment, a method is disclosed for providing ride control for a power machine having a frame and a lift arm assembly that is capable of being raised and lowered with respect to the frame. The method includes activating a suspension system coupled to a lift arm actuator of the power machine and measuring a position of the lift arm assembly after activating the suspension system. The measured position is compared to a stored position. The suspension system is deactivated when the difference between the measured position and the stored position is more than a predetermined movement threshold.

In yet another embodiment, a ride control system for a power machine having a frame and a lift arm assembly pivotally coupled to the frame is disclosed. The ride control system includes a selectively activated suspension system configured to couple allow movement to the lift arm of the power machine and a controller. The controller is coupled to the suspension system and is configured to determine whether the lift arm has lowered more than a threshold amount and to deactivate the suspension system in response to determining that movement of the lift arm has lowered more than the threshold amount.

This Summary is provided to introduce a selection of concepts in a simplified form that are further described below in the Detailed Description.

DETAILED DESCRIPTION OF ILLUSTRATIVE EMBODIMENTS

Before any embodiments of the invention are explained in detail, it is to be understood that the concepts disclosed herein are not limited in their application to the details of construction and the arrangement of components set forth in the following description or illustrated in the following drawings. The concepts illustrated in these embodiments are capable of being practiced or of being carried out in various ways. The terminology used herein is for the purpose of description and should not be regarded as limiting. Words such as "including," "comprising," and "having" and variations thereof herein are meant to encompass the items listed thereafter and equivalents thereof as well as additional items.

Figure 1:
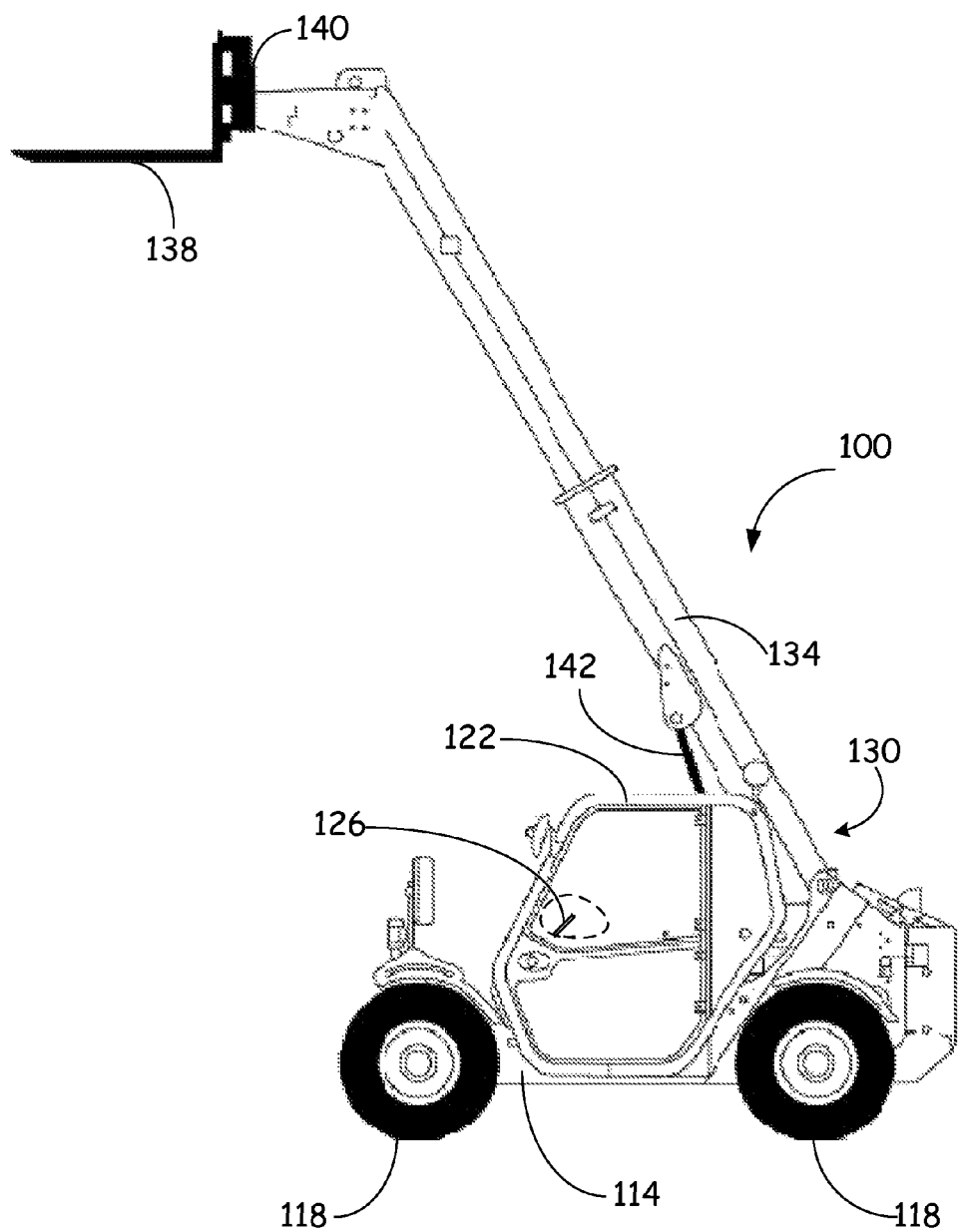
FIG. 1 is a left side view of a representative power machine or vehicle having a lift arm assembly upon which disclosed embodiments can be practiced.

A representative power machine 100 in the form of a work vehicle known as a telehander is shown in FIG. 1 and is provided as one example of a type of power machine upon which disclosed embodiments can be utilized. Other types of power machines on which the disclosed embodiments can be practiced include various types of loaders, excavators, utility vehicles, and the like. Power machine 100 includes a frame 114 supported for movement over the ground by front and rear pairs of wheels 118. An operator compartment 122 is mounted to the frame 114 and includes operator controls 126 for controlling operation of the power machine 100. Operator controls 126 can include any of a variety of different operator control device types, and the illustrated operator controls 126 generally represent the various operator control types. An engine is mounted to the frame 114 and provides a power source for moving the wheels 118 and also for other systems. The engine, represented generally at reference number 130, is typically positioned on a right side of power machine 100 next to operator compartment 122, and therefore is not visible in this figure. The engine 130 can be an internal combustion engine, a hydraulic engine, etc. A lift arm assembly 134, which in this embodiment includes a telescopic boom, is pivotally mounted to the frame 114. An implement 138 is attached to an implement carrier 140 that is mounted to a distal end of the lift arm assembly 134. The implement 138 shown in FIG. 1 is representative of a wide variety of different types of implements, for example including a bucket, pallet forks, etc., that can be attached to implement carrier 140. One or more lift arm actuators 142 in the form of hydraulic cylinders are coupled between the frame 114 and the lift arm assembly 134 for raising and lowering the lift arm assembly 134. One or more other actuators can also be included for performing tilt, boom extension, or other functions. Power machine 100 includes a hydraulic system and a lift arm suspension system such as the one illustrated in example embodiments shown in FIGS. 2-6. While lift arm assembly 134 illustrated in FIG. 1 and discussed above includes a telescopic boom mounted to the frame 114 at a single location, other embodiments can include various different types of lift arm assemblies. For example, in some embodiments, the lift arm assembly is of a similar general configuration as the one shown in FIG. 1 except that it is not a telescoping lift arm. In other embodiments, the lift arm assembly includes a pair of lift arms, mounted to the frame at two locations. This type of lift arm assembly can include a telescoping lift arm or not.

Figure 2:
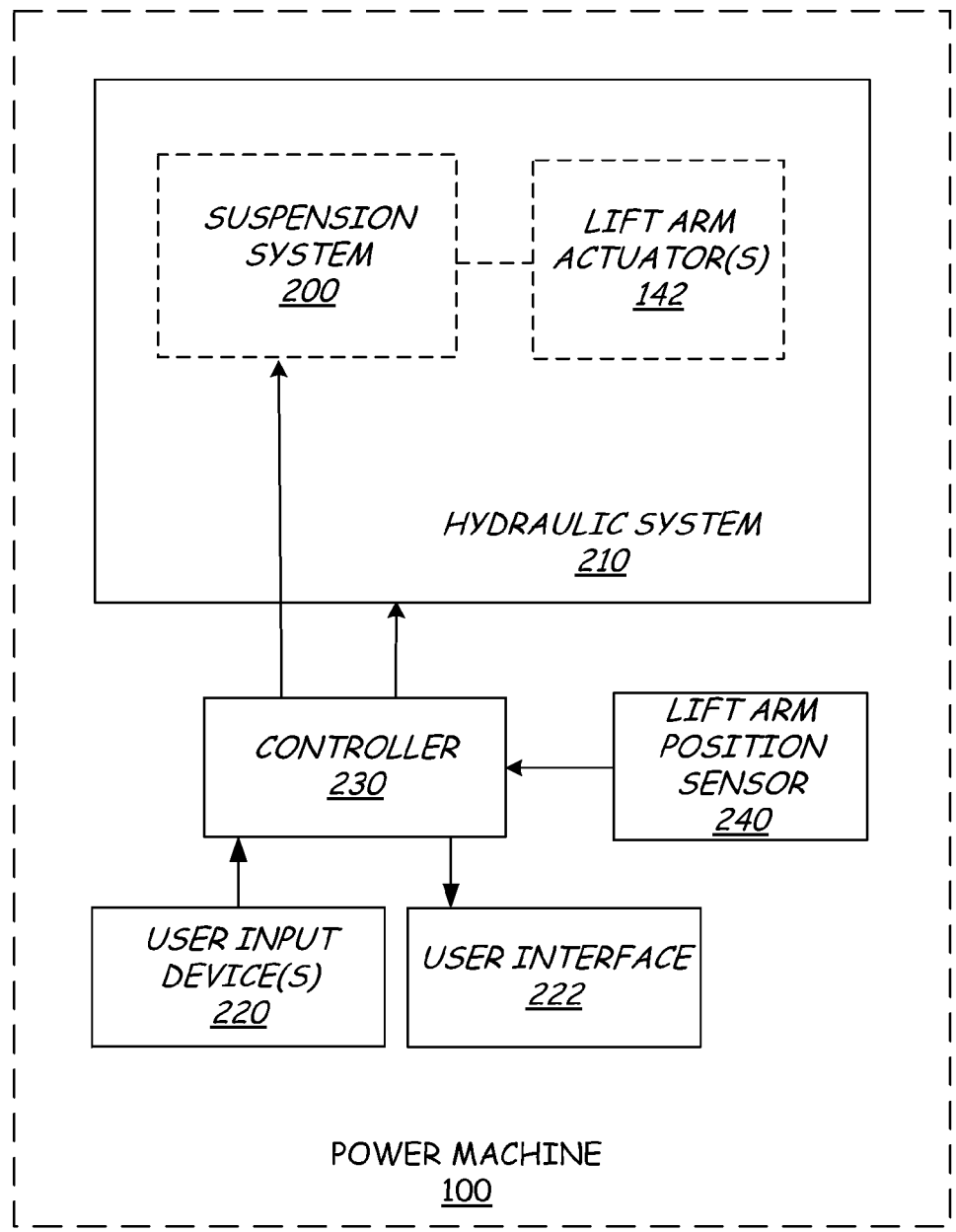
FIG. 2 is a block diagram illustrating a lift arm suspension or ride control system of exemplary disclosed embodiments.

Referring now to FIG. 2, shown is a block diagram illustrating power machine 100 and components used in providing a lift arm suspension system 200 incorporated into a hydraulic system 210 in accordance with disclosed embodiments. A hydraulic system 210 of power machine 100 includes one or more hydraulic pumps that supply hydraulic fluid under pressure to the hydraulic valves, motors and/or other hydraulic components of the hydraulic system and of the power machine. As illustrated, the hydraulic system 210 includes a lift arm actuator 142 in the form of a hydraulic cylinder as shown in FIG. 1, and components of lift arm suspension system 200, described in more detail below, which are configured to selectively employ the lift arm assembly to absorb shock introduced into the power machine 100 when the power machine is operated over rough terrain. While the components shown and discussed herein are included for purposes of disclosing features of the lift arm suspension system 200, those of skill in the art will understand that other lift arm actuators, various valves and hydraulic control circuits, and other components can also be included in hydraulic system 210.

A controller 230, for example an electronic control unit (ECU) or other type of machine controller, provides control signals for controlling various functions of hydraulic control system 210 including lift arm suspension system 200 in accordance with disclosed embodiments. Controller 230 is illustrated in FIG. 2 as a single control unit; however, those of skill in the art will recognize that multiple controllers can be used to implement various aspects of hydraulic system control, including lift arm suspension system control. For example, separate drive and work group controllers can be used, with each performing all or portions of the lift arm suspension system control in various embodiments. Illustration of a single controller does not limit disclosed embodiments to use of a single controller. Further, it will be understood that controller 230 can include, or have associated therewith, computer readable storage media or devices for storing computer-executable instructions which configure controller 230 to implement the disclosed functions, methods and structures.

One or more user input devices 220 are operably coupled to controller 230, using wireless or wired connections, to provide user input signals indicative of intentions to control the hydraulic system 210 of the power machine. The user input devices 220 can be embodiments of operator controls 126 shown in FIG. 1, for example joysticks, foot pedals, push buttons, soft keys on a touch screen display device, or other types of user input devices that capable of providing signals when actuated to a controller for controlling power machine. In illustrative embodiments, the user input devices 220 includes a user-operated device for selecting or deselecting operation of the lift arm suspension system 200. One or more user interface devices 222 such as display panels, indicator lights, audible alarms and the like are in communication with the controller 230 to receive information about the status of the lift arm suspension system. Information can be displayed to the operator in the form of lighted symbols, audible alerts, textual information, and so forth.

A lift arm position sensor 240 provides an input to controller 230 indicative of the position of the lift arm assembly 134 relative to the frame 114. In some embodiments, lift arm position sensor 240 is a device that is capable of measuring a rotational angle of the lift arm assembly 134 relative to a given reference, such as a plane or surface on the power machine. In other embodiments, the lift arm position sensor 240 measures the extension of the lift arm actuator 142. Any suitable sensor or device that can provide an indication of the position of the lift arm assembly relative to the frame to controller 230 can be employed. An illustrative embodiment of the lift arm suspension system 200 is provided in FIGS. 3-6 and discussed in more detail below.

FIG. 3-6 are schematic illustrations of certain components of power machine 100, including components of hydraulic system 210, components of lift arm suspension system 200, user input devices 220 and controller 230. Lift arm actuator 142 is shown as a hydraulic cylinder having a base end 335 and a rod end 337. A simplified hydraulic pressure source 300 is illustrated for discussion purposes, but those of skill in the art will recognize that the hydraulic pressure source can include numerous additional components such as pumps, valves, etc. Hydraulic pressure source 300 as shown includes a hydraulic pump 305 and a control valve 320. Hydraulic pump 305 draws hydraulic fluid from a tank 315 and provides pressurized fluid to the control valve 320. The control valve 320, in the illustrative embodiment, includes a spool 322 moveable between a first position 302, a second position 304, and a third position 306. In the embodiments shown in FIGS. 3-6, the controller 230 is in communication with a pair of valve actuators 324 and 326 that are capable of being actuated to move the spool 322 between the first, second, and third positions 302, 304, and 306.

In one embodiment, the valve actuators are electrically actuated solenoid valves capable of providing pressurized hydraulic fluid to and/or evacuating pressurized hydraulic fluid from an end of the spool 322 to cause the spool to shift from one of the three shown positions to another. In addition, biasing elements 308 and 310 provide forces against the spool 322 to urge it toward a biased position, that is, the second position 304. Thus, the biasing elements 308 and 310 will cause the spool 322 to move toward the second position 304 when neither of the valve actuators 324 and 326 are providing an actuating force to shift the spool 322. The spool 322 is described above as being actuated in some embodiments by solenoid valves; in other embodiments, other actuators can be employed. For example, an electrical linear actuator can coupled to and actuate the spool 322. Although the biasing elements 308 and 310 shown diagrammatically as a pair of springs on either side of the spool 322, it should be appreciated that any biasing devices that can advantageously urge the spool 322 towards a biased position. In some embodiments, a single spring can be captured on one side of the spool so as to resist movement in the spool in either direction, in which case the single spring can act as the biasing element against forces in either direction. While the biased position shown here is a centered position, in other embodiments, the biased position need not be a center position.

Figure 3:
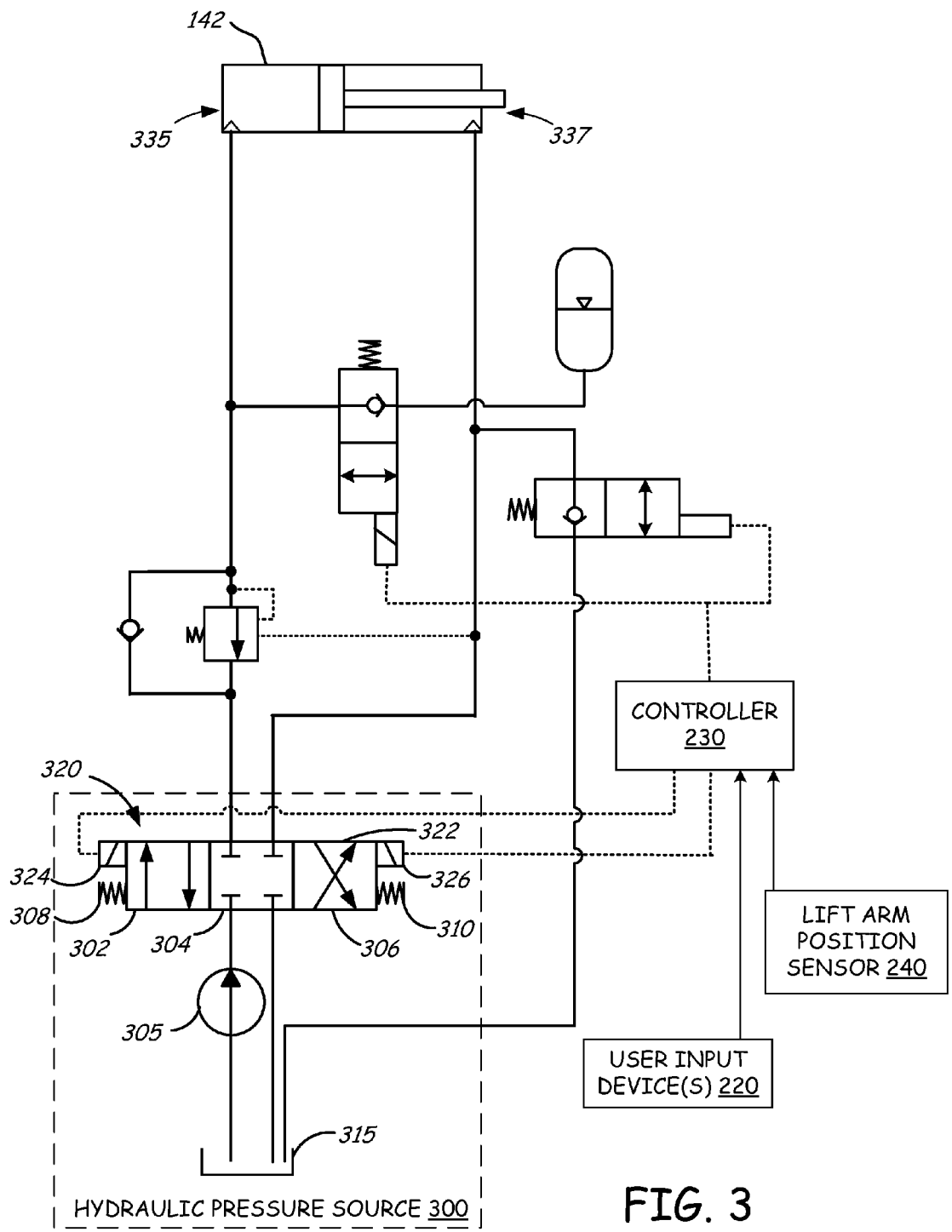
FIGS. 3-6 are schematic illustrations of hydraulic and control system components of a lift arm suspension system according to an example embodiment.

In FIG. 3, the spool 322 of control valve 320 is shown in the second position 304, such that the hydraulic pump 305 is blocked from providing pressurized fluid to either of the base end 335 or the rod end 337 of lift arm actuator 142. It is in this position, as discussed in more detail below, that the lift arm suspension system is advantageously employed.

Figure 4:
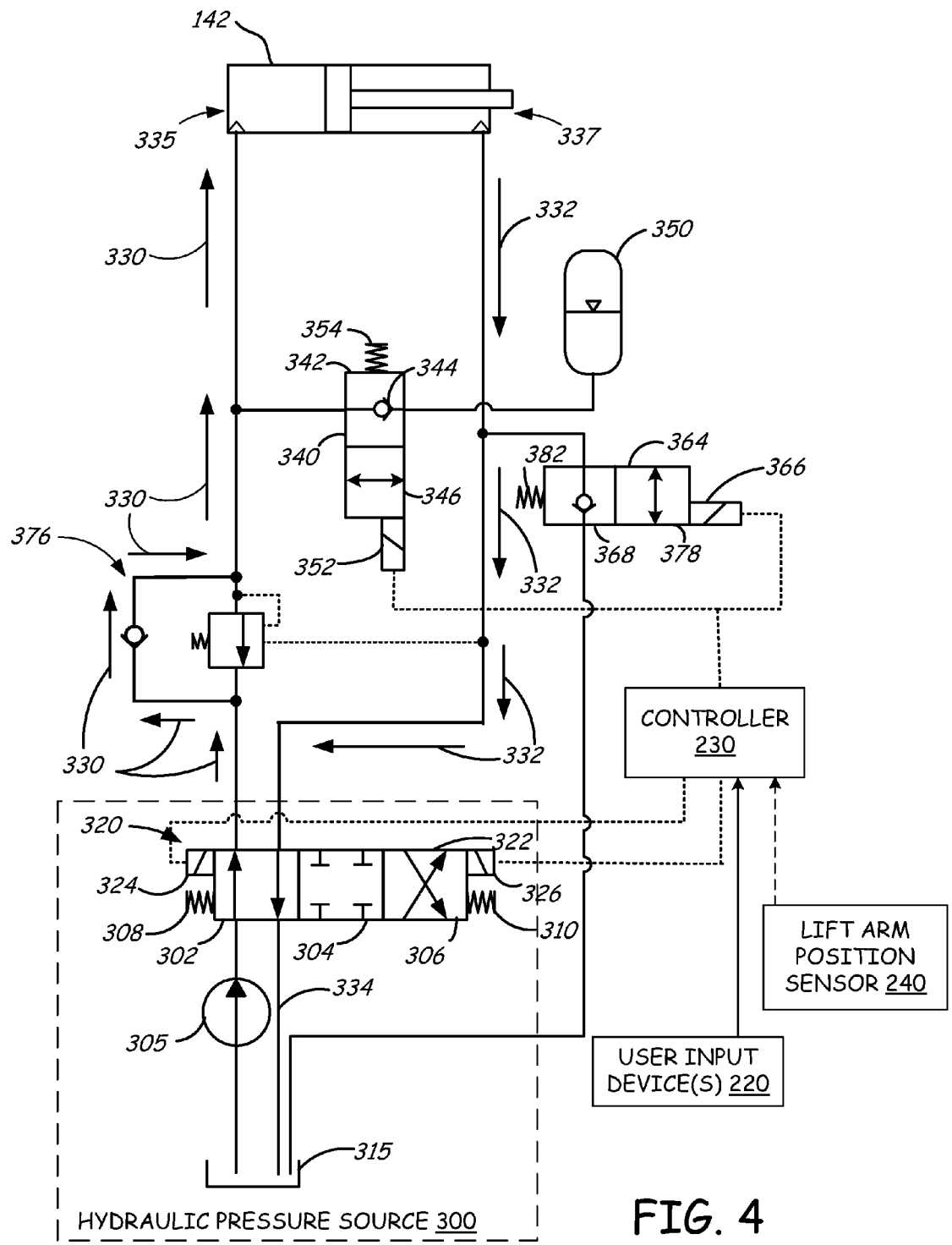

In FIG. 4, the spool 322 is shifted to the first position 302 so that the hydraulic pump 305 is capable of providing pressurized hydraulic fluid to the base end 335 of the lift arm actuator 142 along the path illustrated by arrows 330. Pressurized hydraulic fluid is provided to the base end 335 of the lift arm actuator 142 and an evacuation path is provided from the rod end 337 of the lift arm actuator along the path shown by arrows 322 to the control valve 320 and through a drain line 334 to the tank 315. When hydraulic fluid is provided to the lift arm actuator 142 in this arrangement, the lift arm actuator is extended, which, in some embodiments, causes the lift arm assembly to be raised. In instances where the spool is shifted to the third position 306, the control valve 320 provides hydraulic fluid to the rod end 337 of the lift arm actuator 142 according to a flow path that is the opposite of that shown by arrows 330 and 332 in FIG. 4 so as to retract the lift arm actuator.

FIG. 4 also shows components of the lift arm suspension system 200 in a deactivated state. A suspension valve 340 is in communication with the base end 335 of the lift arm actuator 142. The suspension valve 340 is illustratively a selection valve that provides in a first position 342, as shown in FIG. 4, a one-way block in the form a check valve 344 that prohibits flow into an accumulator 350. However, if the accumulator is sufficiently charged to overcome the check valve in the first position 342, hydraulic fluid can be provided from the accumulator 350 to the base end 335 of the lift arm actuator 142. Of course, when the spool 322 is in the first position 302 as in FIG. 4, it is unlikely that the pressure on the opposing side of the check valve 344 is lower than the pressure at the accumulator 350 and in this configuration, then, the first position 342 effectively blocks charging of the accumulator 350. The suspension valve 340 also has a second position 346 that provides an open path between the base end 335 of the lift arm actuator 142 and the accumulator 350. A suspension valve biasing mechanism 354 biases the suspension valve 340 to the first position 342 as shown in FIG. 4. A suspension valve actuator 352 is in communication with the suspension valve 340 and is illustratively controlled by the controller 230. When it receives an activation signal from the controller 230, the suspension valve actuator 352 overcomes the biasing mechanism 354 to move the suspension valve 340 into the second position 346. In some embodiments, the suspension valve actuator 352 is a solenoid valve that controls the introduction and/or evacuation of pressurized fluid for shifting the position of the suspension valve 340. In other embodiments other types of actuators can be used.

A drain valve 364 is in communication between the rod end 337 of the lift arm actuator 142 and the tank 315. Drain valve 364 as shown in FIG. 4 is a two-position valve with a first position 368 and a second position 378. Drain valve 364 is biased toward the first position 368 by drain valve biasing member 382 that, in one embodiment, is a spring. A drain valve actuator 366 is operably coupled to the controller 230 to receive an actuation signal. When received, the actuation signal causes the drain valve actuator 366 to apply an actuation force to the drain valve to overcome the drain valve biasing member 382 and move the drain valve 364 to the second position 378. In the embodiment illustrated in FIG. 4, the actuation signal provided to the drain valve actuator 366 is common to a signal provided to the suspension valve 340, although in other embodiments, this is not the case—the signal provided to the drain valve actuator 366 is a separate signal from controller 230. As with the suspension valve 340, when the lift arm suspension system 200 is deactivated, the drain valve 364 is not activated and is in the first position, as shown in FIG. 4.

Figure 4A:
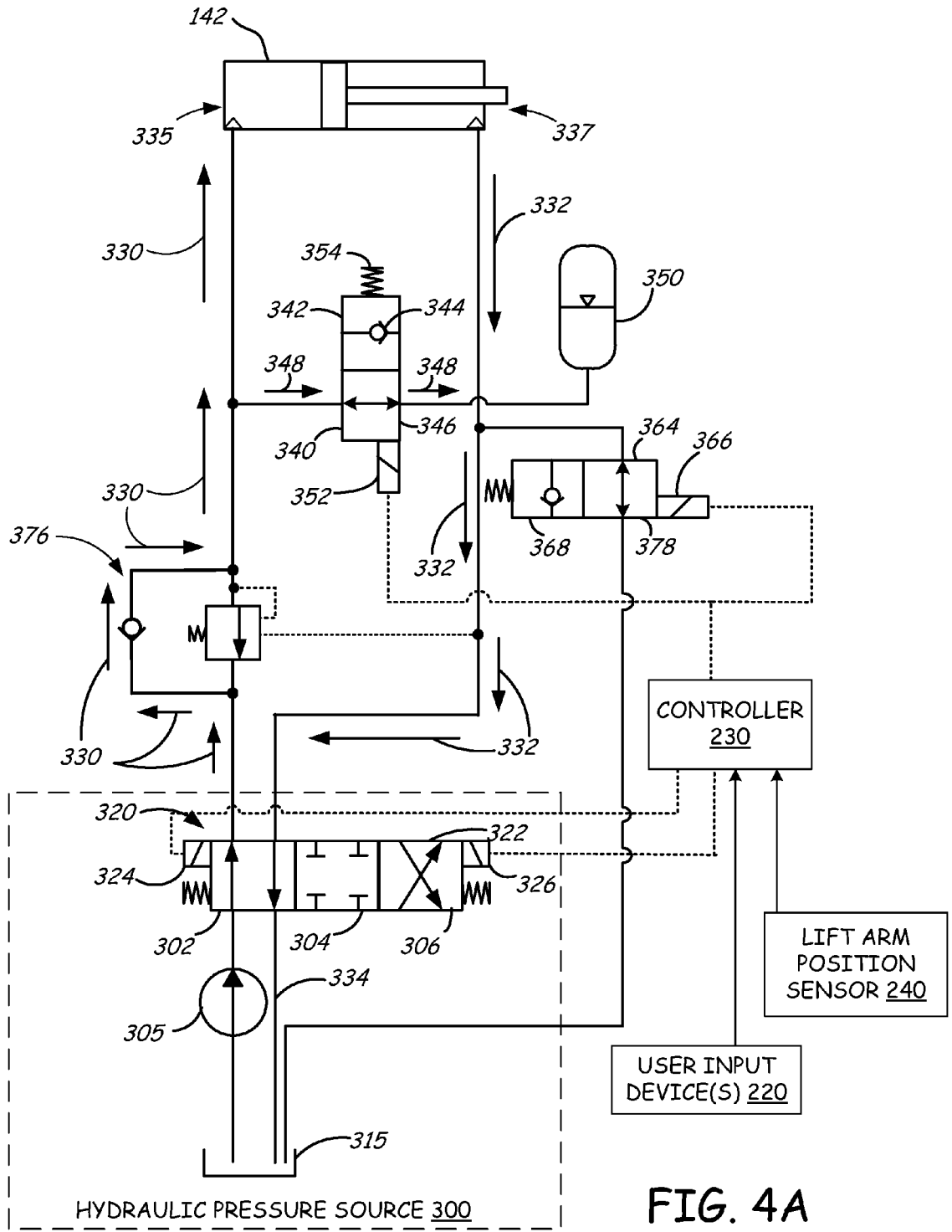

In FIG. 4A, the suspension system is in activated state. The controller 230 has provided an activation signal to both the suspension valve 340 and the drain valve 364. Correspondingly, both the suspension valve 340 and the drain valve 364 are shown in their respective second positions 346 and 378. In addition, the spool 322 of control valve 320 is shown in the first position 302 so that pressurized hydraulic fluid is provided to the base end 335 of the lift arm actuator 142. With the suspension valve 340 in the second position, the same pressurized hydraulic fluid is provided to the accumulator 350 via a path indicated by arrows 348 to charge the accumulator.

Figure 5:
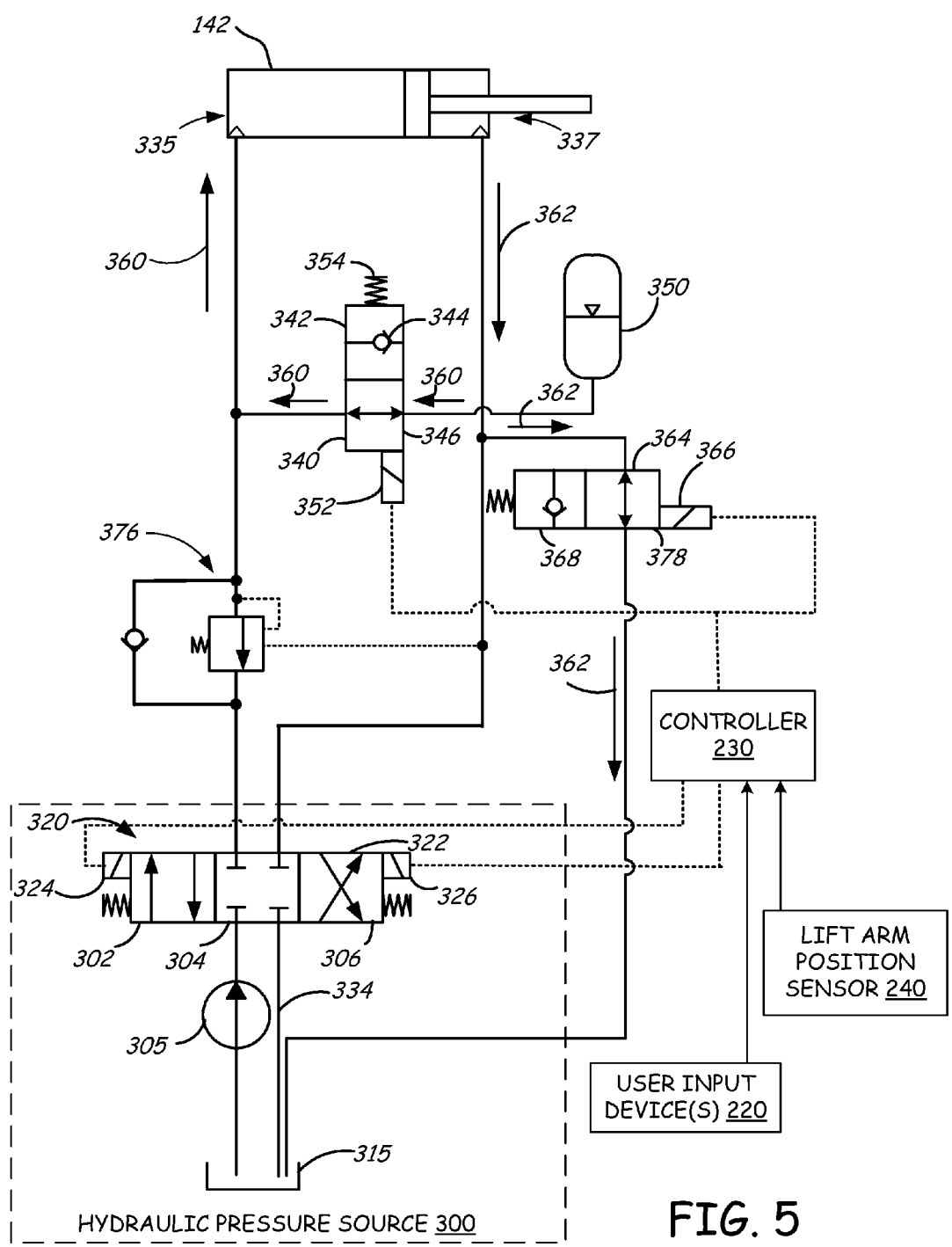
Figure 6:
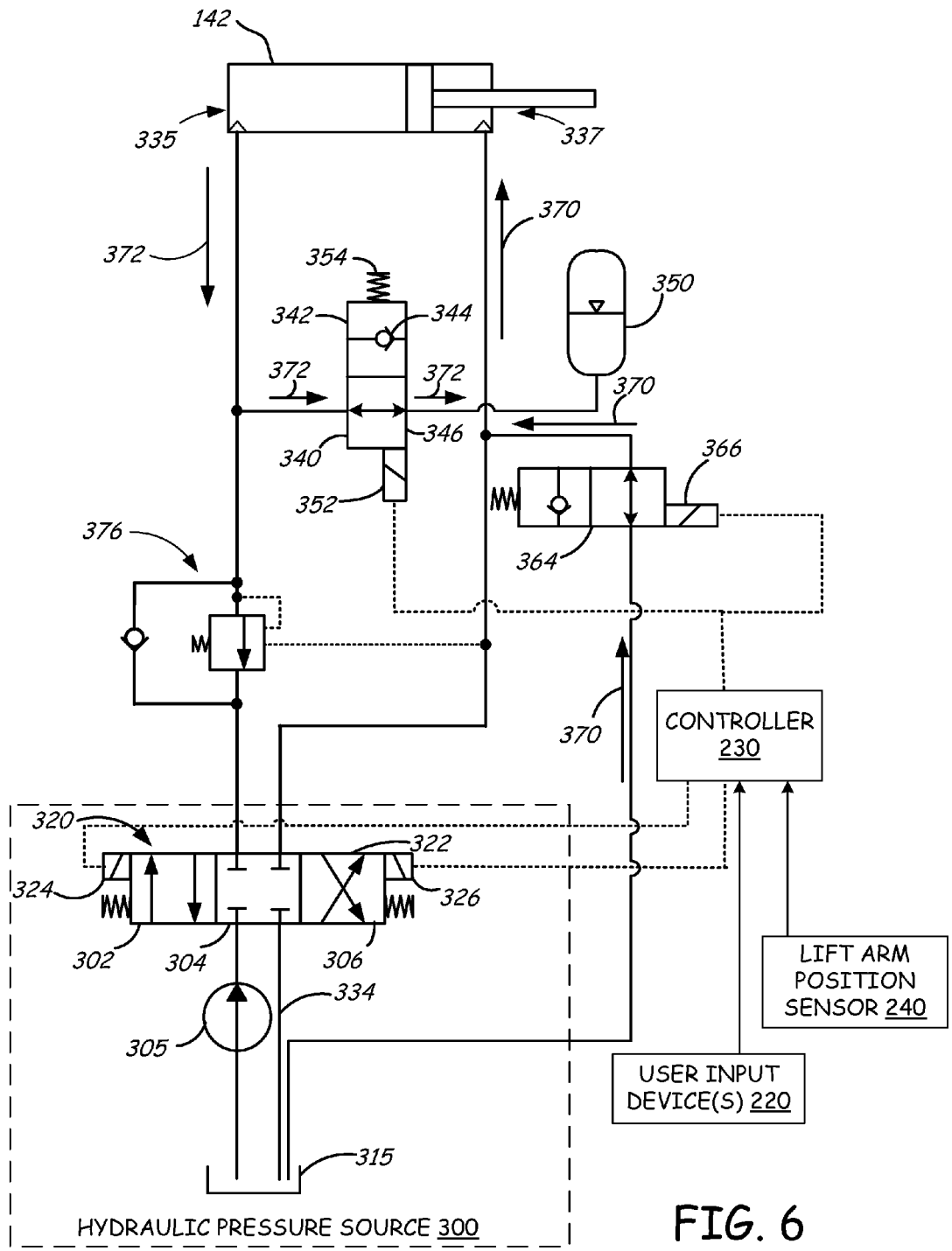

Referring now to FIGS. 5-6, the spool 322 is shown in the second position 304 thereby blocking flow from the hydraulic pump 305 to the lift arm actuator 142. The lift arm suspension system 200 is activated, and thus the suspension valve 340 is in a second position 346 and the drain valve 364 is in a second position 378. Moving over rough terrain can introduce shock forces into the machine, which will cause the lift arm assembly to tend to move in an upward or downward direction (i.e. raise or lower) when the suspension system is active. When a force tends to urge the lift arm assembly in an upward direction, the lift arm assembly will move only if additional hydraulic fluid is introduced into the base end 335 of the lift arm actuator 142. FIG. 5 shows the flow path out of the accumulator 350 and into the base end 335 of the lift arm actuator 142 as shown by arrows 360 to allow for such upward movement. Fluid also flows out of the rod end 337 of the lift arm actuator 142 along the path shown by arrows 362, through the drain valve 364 before returning to the tank 315.

FIG. 6 shows the flow path 370 into the rod end 337 of the lift arm actuator 142 and the flow path 372 out of the base end 335 of the lift arm actuator. When a shock force has been introduced into the machine such that the lift arm assembly has force on it to retract the lift arm actuator 142, fluid is drawn in through the drain valve 364 and into the rod end 337 of the lift arm actuator. Retraction of the lift arm actuator 142 forces fluid out of the base end 335 of the lift arm actuator along path 372 to the accumulator 350. If the accumulator 350 becomes fully charged, pressure will build up until the load holding valve 376 is moved to allow flow to return back to tank 315 via a port relief valve (not shown) in valve 320 that bypasses the spool 322.

As discussed above, if the accumulator 350 is empty and a load is added to the lift arm assembly, that load will cause the lift arm assembly to lower to fill the accumulator if the suspension system is activated. The systems and methods discussed below recognize when the lift arm assembly is being raised and lowered due to forces acting on it when the suspension system is activated, as opposed to commanded movement of the lift arm assembly from signals provided from manipulated operator input devices 220. While the nature of the suspension systems discussed herein necessitate that the lift arm assembly will move without commanded signals, the systems and methods detect large uncommanded movements and will deactivate the suspension system when it is determined that the movements are outside of a predetermined window of movement, especially movements of the lift arm assembly in a downward direction. In each of FIGS. 3-6, lift arm position sensor 240 is shown coupled to controller 230 through a hard-wired, wireless or network connection. As discussed above, lift arm position sensor 240 provides a signal or data indicative of an angle of lift arm assembly 134 relative to a reference plane or surface, which can be a plane or surface of the machine, of the ground, or of other surfaces or planes. In accordance with exemplary embodiments, controller 230 is configured to continuously monitor, or to monitor at predetermined close intervals so as to approximate continuous monitoring, the angle of lift arm assembly 134 and to compare the measured angle against a stored angle value. If an abnormal occurrence of lift arm assembly lowering occurs, for example lowering by more than a predetermined number of degrees or predetermined percentage within a predetermined period of time (e.g., a set time period, a time period corresponding to a sampling rate, etc.), then controller 230 turns off the lift arm suspension function by causing valve 340 to move to the state shown in FIG. 4. This prevents any of the hydraulic fluid being provided to base end 335 of actuator 142 from being diverted toward accumulator 350. Analysis has shown that this corrective action quickly slows and stops the lowering of the lift arm assembly. Advantageously, disclosed embodiments provide both the benefits of a ride control or lift arm suspension function, and the benefits of limiting the total uncommanded movement of the lift arm assembly, as are sometimes experienced in rough terrain scenarios.

Figure 7:
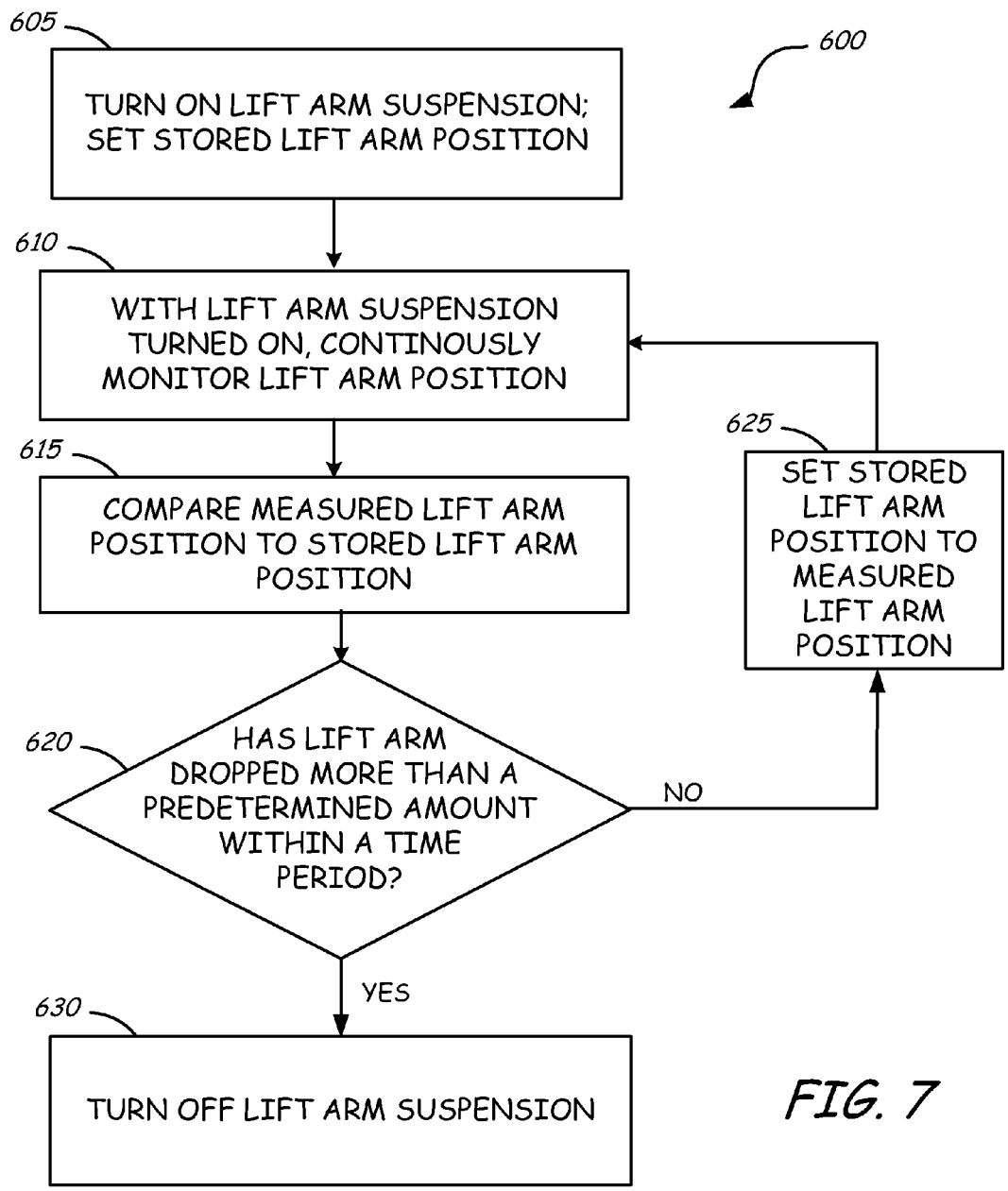
FIG. 7 is a flow diagram illustrating an example of a method of operating a lift arm suspension system of a power machine according to one illustrative embodiment.

Referring now to FIG. 7, provided is a first illustration of a method flow diagram 600 describing exemplary embodiments. As shown at block 605, the lift arm suspension function is first turned on and the lift arm assembly position is stored in the controller 230. It should appreciated that any time that the lift arm assembly is moved in a commanded movement, that is, in response to signals provided by user input devices 220, the lift arm assembly position will be modified and stored in the controller 230 to represent the new commanded lift arm assembly position. As discussed above, this can be accomplished using controller 230 to position valve 340 as shown in FIG. 4A to allow accumulator to be filled. With the lift arm suspension turned on, lift arm position sensor 240 is used to continuously (or at a near continuous approximating sampling rate) measure the lift arm assembly position as shown at block 610. Then, at block 615, the measured lift arm assembly position is compared to a previously stored lift arm assembly position. At block 620, a determination is made as to whether the lift arm assembly has lowered by more than a predetermined amount (number of degrees, percentage, etc.) within a time period (e.g., between sampling periods) based on the comparison in block 615. If the lift arm assembly has not lowered more than the predetermined amount, the previously stored lift arm assembly position is replaced in storage with the measured lift arm assembly position at block 625, and the monitoring returns to block 610. If, however, it is determined that the lift arm assembly has lowered more than the predetermined amount in the time period, then at block 630, the lift arm suspension is automatically turned off by moving the valve 340 to the first position 342 as shown in FIG. 4.

Figure 8:
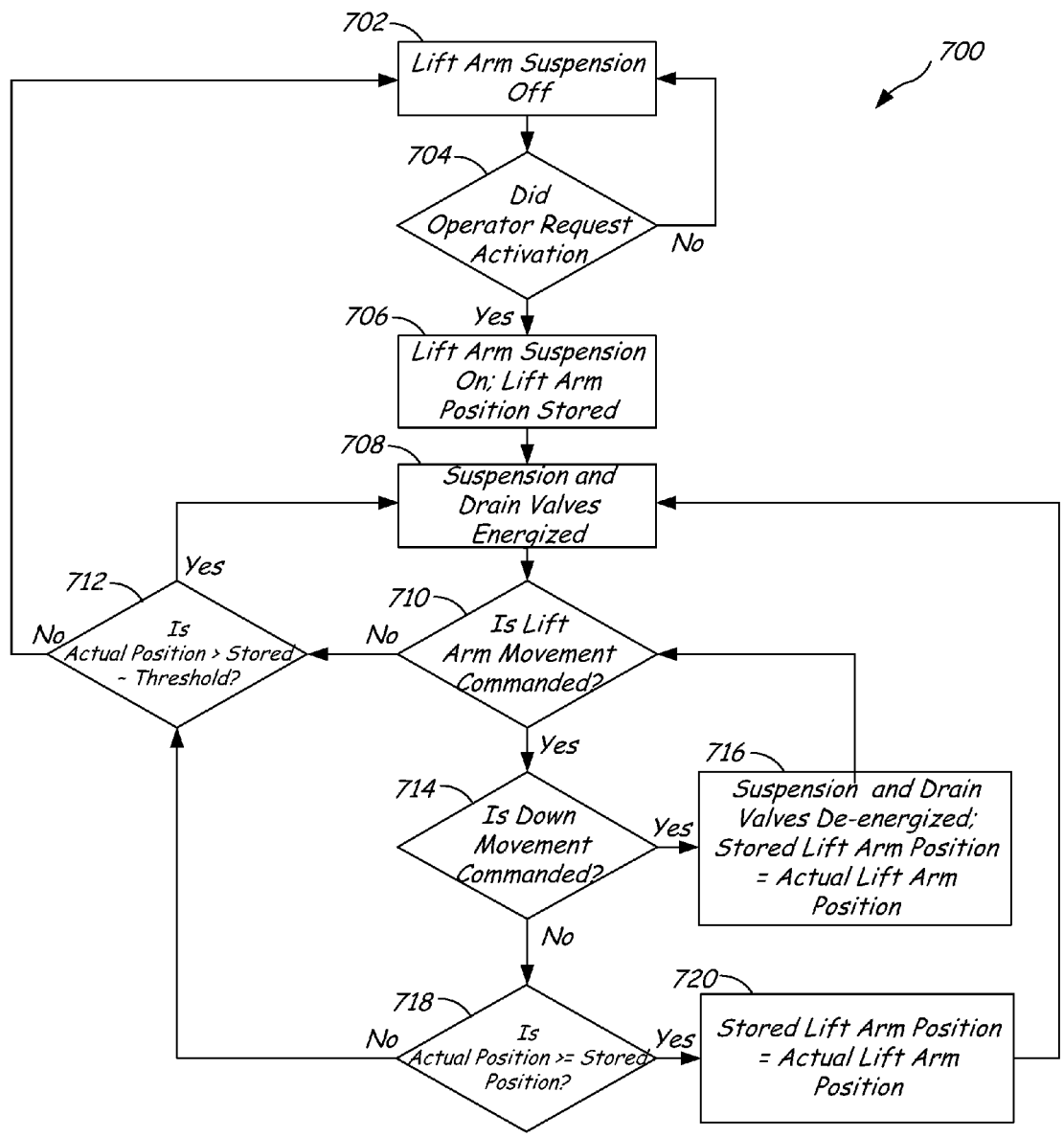
FIG. 8 is a flow diagram illustrating an example of a method of operating a lift arm suspension system of a power machine according to another illustrative embodiment.

FIG. 8 discloses a method 700 of operating a lift arm suspension or ride control feature according to another illustrative embodiment. The method begins with lift arm suspension system in a deactivated or off condition, as is illustrated in block 702. When the lift arm suspension system is deactivated, it will not be activated until an operator requests that it be activated. In one embodiment, the operator requests activation of the lift arm suspension system by manipulating one or more of the user input devices 220. At block 704, the method checks to see if an operator has validly requested operation of the lift arm suspension system. If the operator has not made a valid request for lift arm suspension system operation, the method returns to block 702. If however, a valid request has been detected, the lift arm suspension system is turned on or activated, at block 706. In addition, the position of the lift arm assembly read by the lift arm position sensor 240 is stored in memory of controller 230 or in memory accessible by controller 230. In addition, the controller 230 can provide an indication of the lift arm suspension system being active via user interface 222.

At block 708, the suspension and drain valves are energized. The method then checks to see if a lift arm assembly movement has been commanded at block 710. If a lift arm assembly movement has not been commanded by an operator through the manipulation of one or more user input devices 220, the method continues to block 712, where the actual position of the lift arm assembly, as measured by the lift arm position sensor 240, is measured against the stored lift arm assembly position. If the actual position is at least the stored position of the lift arm assembly less a threshold amount, the suspension system remains on and the suspension and drain valves are energized. In one embodiment, the threshold valve amounts to about four degrees of angular rotation of the lift arm assembly, but other values for the threshold can be used. If, however, the actual lift arm assembly position is less than the stored lift arm assembly position less the threshold, the lift arm suspension system is deactivated, as shown at block 702. In some embodiments, the user interface 222 provides an audible and/or visual indication that the lift arm suspension system has been deactivated without input from the operator.

Returning to block 710, if it is determined that the operator has commanded movement of the lift arm assembly, the method next moves to block 714 to determine whether the commanded movement is in the downward direction. If so, the method moves to block 716, in which the suspension and drain valves are de-energized and the stored lift arm assembly position is set to the actual lift arm assembly position. The routine then goes back to block 710 to check whether the lift arm assembly movement is still commanded. As long as the down (or lowering) movement is commanded, the suspension and drain valves remain de-energized and the stored lift arm assembly position is set to the actual lift assembly position. When lift arm assembly movement is no longer commanded, the actual position and stored position of the lift arm assembly are compared at block 712 and, presuming that the actual lift arm assembly position at least as high as the stored lift arm assembly position less the threshold, the suspension and drain valves are then re-energized at block 708.

If it is determined at block 714 that the commanded movement is not in the down direction, that is, it is in the up (or raised) direction, the stored position of the lift arm assembly is compared directly against the actual position of the lift arm assembly at block 718. If the actual position is determined to be greater than or equal to the stored position, the stored lift arm assembly position is set to the actual lift arm assembly position at block 720 and the suspension and drain valves are energized at block 708. If, however, the actual lift arm assembly position is less than the stored lift arm assembly position, the actual lift arm assembly position is compared to the stored lift arm assembly position less the threshold at block 712. As long as the actual lift arm assembly position is greater than the stored lift arm assembly position less the threshold, the lift arm suspension system will remain active until the operator indicates, through manipulation of the operator input devices 222, an intention to deactivate the lift arm suspension system, at which point the system will be deactivated until the operator provides an additional input to re-activate the system.

Although the subject matter has been described in language specific to structural features and/or methodological acts, it is to be understood that the concepts disclosed herein are not limited to the specific embodiments described. Rather, the specific features and acts described above are disclosed as example forms. For example, in various embodiments, different types of power machines can include the disclosed lift arm suspension systems. Also, in other embodiments, the rod and base ends of the lift arm actuator can be reversed, different types of accumulators, valves or other components can be used, and other component changes can be made. Other examples of modifications of the disclosed concepts are also possible, without departing from the scope of the disclosed concepts.

What is claimed is:

1. A power machine comprising:
   a frame;
   a lift arm assembly pivotally coupled to the frame and configured to be raised and lowered with respect to the frame;
   a selectively activated lift arm suspension system operably coupled to the lift arm assembly;
   a controller, coupled to the lift arm suspension system, configured to determine whether the lift arm assembly has moved more than a threshold amount and to deactivate the lift arm suspension system in response to determining that the lift arm assembly has moved from a first position to a second position more than the threshold amount within a predetermined period of time and in response to determining that the movement of the lift arm assembly is an uncommanded movement of the lift arm assembly; and
   a lift arm position sensor operably coupled to the controller and configured to provide an indication to the controller of a position of the lift arm assembly.

2. The power machine of claim 1, wherein when the lift arm suspension system is activated, the controller is configured to store a lift arm position value, continuously monitor a lift arm position by comparing the lift arm position to the stored lift arm position value, and determine whether the lift arm assembly has moved more than the threshold amount based on the comparison.

3. The power machine of claim 1, wherein the controller being configured to determine whether the lift arm assembly has moved more than threshold amount comprises the controller being configured to determine whether the lift arm assembly has moved more than the threshold amount within the predetermined time period.

4. The power machine of claim 1, wherein the controller is further configured to determine whether to deactivate the lift arm suspension system as a function of whether a movement of the lift arm assembly has been commanded.

5. The power machine of claim 1, wherein the controller determines whether to deactivate the lift arm suspension system in response to a determination that the lift arm assembly has lowered more than the threshold amount.

6. The power machine of claim 1, and wherein the lift arm suspension system is a part of a hydraulic system that comprises:
   a lift arm actuator operably coupled to the lift arm assembly;
   a control valve in fluid communication with the lift arm actuator and configured to control a fluid flow to and from the lift arm actuator;
   a suspension valve operably coupled to the controller such that a position of the suspension valve is controlled by the controller; and
   an accumulator in selective fluid communication, through the suspension valve, with the lift arm actuator;
   wherein when the lift arm suspension system is activated, pressurized hydraulic fluid is allowed to flow between the accumulator and the lift arm actuator via the suspension valve.

7. The power machine of claim 6, wherein the hydraulic system further comprises a drain valve operably coupled to the controller such that a position of the drain valve is controlled by the controller, the drain valve providing a hydraulic fluid flow path from the lift arm actuator to a drain.

8. The power machine of claim 7, and wherein the controller is further configured to energize the suspension valve and the drain valve to activate the suspension system and to de-energize the suspension valve and the drain valve to deactivate the suspension system.

9. A method of providing ride control for a power machine having a frame and a lift arm assembly capable of being raised and lowered with respect to the frame, the method comprising:
   activating a suspension system coupled to a lift arm actuator of the power machine;
   measuring a position of the lift arm assembly after activating the suspension system, according to a lift arm position sensor;
   comparing the measured position to a stored position; and
   deactivating the suspension system when the difference between the measured position and the stored position is more than a predetermined movement threshold during a predetermined period of time after activation of the suspension system.

10. The method of claim 9, wherein measuring the position of the lift arm assembly and comparing the measured position to the stored position is performed repeatedly while the suspension system is activated.

11. The method of claim 9, wherein deactivating the suspension system in response to determining that movement of the lift arm assembly from the stored position to the measured position is beyond the predetermined movement threshold further comprises deactivating the suspension system if it is determined that the lift arm assembly has lowered more than the threshold amount.

12. The method of claim 9 and further comprising:
detecting a signal indicating a commanded lowering of the lift arm assembly; and
deactivating the suspension system.

13. The method of claim 12 and further comprising:
detecting a transition from a signal indicating commanded lowering of the lift arm assembly to a signal indicating one of a commanded raising of the lift arm assembly and no commanded movement of the lift arm assembly;
storing the position of the lift arm assembly;
activating the suspension system coupled to a lift arm actuator of the power machine;
measuring the position of the lift arm assembly after activating the suspension system;
comparing the measured position to the stored position; and
deactivating the suspension system when the difference between the measured position and the stored position is more than a predetermined movement threshold.

14. The method of claim 9 and further comprising replacing the stored position of the lift arm assembly with the measured position of the lift arm assembly when the comparison of the measured position and the stored position indicates that movement of the lift arm assembly from the stored position to the measured position within a predetermined period of time was less than the predetermined movement threshold.

15. The method of claim 9, wherein activating the suspension system comprises:
measuring a position of the lift arm assembly;
setting the stored position equal to the measured position; and
activating components of the suspension system.

16. A ride control system for a power machine having a frame and a lift arm assembly pivotally coupled to the frame, comprising:
a selectively activated suspension system configured to allow movement of the lift arm assembly of the power machine;
a controller, coupled to the suspension system, configured to determine whether the lift arm assembly has lowered more than a threshold amount and to deactivate the suspension system in response to determining that movement of the lift arm assembly from a first position to a second position within a predetermined period of time is beyond the threshold amount and in response to determining that the movement of the lift arm assembly is an uncommanded movement of the lift arm assembly; and
a lift arm position sensor operably coupled to the controller and configured to provide an indication to the controller of a position of the lift arm assembly.

17. The ride control system of claim 16 and wherein the controller is further configured not to deactivate the suspension system in response to detecting that the movement of the lift arm assembly is a commanded movement of the lift arm assembly and that the commanded movement of the lift arm assembly is in an upward direction.

18. The ride control system of claim 16 and wherein the indication to the controller of a position of the lift arm assembly is relative to the frame.

19. The ride control system of claim 16 and wherein the lift arm position sensor is further configured to measure a rotational angle of the lift arm assembly relative to a given reference.

20. The ride control system of claim 16 and wherein the lift arm position sensor is further configured to measure an extension of the lift arm actuator.

* * * * *